Patented Feb. 19, 1929.

1,702,966

UNITED STATES PATENT OFFICE.

JOSEPH F. HAGGERTY, OF CORONADO, CALIFORNIA, ASSIGNOR TO NATIONAL GYPSUM COMPANY, OF BUFFALO, NEW YORK, A CORPORATION OF DELAWARE.

WALL BOARD.

No Drawing.   Application filed July 13, 1925. Serial No. 43,407.

My invention relates to wall board of the type commonly used in place of lath and plaster in the construction of buildings. My invention relates particularly to an improved plaster wall board and to a method of making this product.

Plaster wall board of the type to which my invention relates is now made with a gypsum core lined on both sides with heavy paper. The board is usually made in large panels, approximately three-eighths of an inch in thickness. It is not feasible to make the wall board out of gypsum alone because the product so made would be very heavy and it would be too brittle to be of much use as a substitute for lath and plaster in the construction of buildings. It is common to incorporate with the gypsum some light material such as sawdust which acts as a filler and decreases the weight of the product. Fillers of this sort not only decrease the weight of the board but also have a tendency to decrease the liability to chipping when nails are driven through the board in securing it to the studding of a building.

The usual practice is to roll the gypsum while still wet and plastic, into shape on the lower liner, and the natural adhesive properties of the gypsum are relied upon to secure the gypsum to the liner. It is not uncommon to add to the plastic mass some material such as a starchy composition, having a tendency to strengthen the bond between the gypsum and the liners.

Experience with the ordinary plaster wall board composed of gypsum and a sawdust filler has shown that this product is not entirely satisfactory as a substitute for the lath and plaster ordinarily used in building construction. The sawdust, while making the product light and perhaps rendering the product less liable to chip, has the effect of weakening the product to a considerable degree. This is probably due to the fact that there is not a strong bond between the gypsum and the particles of sawdust. During the process of manufacturing ordinary plaster board, the sawdust takes up moisture from the plastic mass of gypsum and the particles of sawdust become swollen due to the presence of a considerable quantity of moisture. Incidentally, the sawdust in taking up this moisture, robs the gypsum immediately adjacent to the wood particles, of some of the water which would otherwise enter into combination with the gypsum molecules to form the desired crystalline structure. When the product is dried, the particles of sawdust naturally shrink to a considerable extent and this fact, coupled with the fact that the gypsum immediately adjacent to the wood particles, does not become hardened properly, is responsible for the comparatively weak bond between the wood particles and the surrounding gypsum.

It has been proposed to avoid the use of sawdust by employing some material such as a starchy product which tends to make the plaster board porous and light. The resulting product is stronger than the ordinary sawdust filled wall board, the increased strength being due to the fact that there is no weakening material such as sawdust in the product. Nevertheless, the wall board made by the use of starch attracts considerable moisture and vermin.

The principal object of the present invention is to provide a plaster board which is much lighter than the ordinary plaster board having a sawdust filler and yet which is much stronger than the ordinary plaster board product. I have discovered that an improved product can be made by utilizing a relatively small percentage of wood fibers thoroughly incorporated with the gypsum in such a manner that the gypsum is homogeneous throughout and of the same hardness or density throughout. The fibers, preferably obtained by reducing paper, such as old newspapers, to a fine pulp, serve as a means for rendering the product light, and the strength of the wall board is increased to a very marked extent due to the reinforcing action of the fibers extending throughout the mass. The dry weight of the wood fibers in the finished product should be somewhat between one and one-half to five percent of the weight of the gypsum, approximately two percent being preferable. The amount of fibrous material is not great enough to prevent the gypsum from hardening into a very solid mass although the fibers render the product much lighter than the ordinary plaster wall board. I have found that the improved product weighs in the neighborhood of 400 to 500 pounds per thousand square feet, less than the ordinary plaster board. In a thousand square feet of the new product, the paper liners weigh approximately 175 pounds. The gypsum and the water present both as water of crystallization and as free moisture weigh about 1200 pounds and the weight of the fibers is in the neighborhood of 25 pounds, making in all 1400 pounds. The ordinary plaster board containing sawdust filler weighs in the neighborhood of 1800 to 1900 pounds per thousand square feet.

In making the improved product, it is quite important to have the fibrous material thoroughly saturated with water before it comes in contact with the gypsum. This prevents the fibrous material from robbing the gypsum of any of the moisture needed for the process of crystallization. I prefer to make the improved plaster board by first reducing paper such as old newspapers to a pulpy mass in a beater. The fibers may, of course, be obtained from any desired source but I prefer to employ waste paper because of its cheapness and because it contains a certain amount of size which tends to improve the product. Sulphite fiber or kraft fiber could, of course, be used instead of the waste paper pulp but it is not necessary to use these more expensive materials. The amount of water employed in the beating operation may depend entirely upon the nature of the beating engine employed and may conform to the established practice in reducing fibrous materials to a pulpy condition.

After the fibrous material has been converted into a homogeneous pulpy mass, it should be thinned with water until the amount of fibers is in the neighborhood of 1 to 5 percent by weight of the water. I am referring to the dry weight of the fibers. The water employed during the beating process may be cold, that is, at normal atmospheric temperature, or it may be hot. I have found that where cold water is employed, the product is somewhat stronger than where hot water is used. On the other hand, the hot water has a tendency to improve the adhesive properties of the material and make it adhere to the liners more firmly.

After the fibrous mass has been prepared as above described, dry gypsum is added until the mass acquires the desired consistency. By dry gypsum, I refer to plaster of Paris $(CaSO_4)_2.H_2O$, which, when mixed with water produces a crystalline coherent mass of gypsum $CaSO_4.2H_2O$. I prefer to add 100 pounds of gypsum to from 100 to 150 pounds of the liquid containing the fibers, about 120 pounds of the liquid giving perhaps the best results. Where the smaller percentage of liquid is employed, the product is stronger and denser than is the case where more of the liquid is mixed with a given amount of plaster of Paris. The plaster of Paris can be mixed with the liquid in a batch mixer. This method of combining the plaster of Paris and the liquid gives very good results because it provides a thorough distribution of the fibers throughout the plaster of Paris.

Any of the methods now employed for the purpose of mixing plaster of Paris may, of course, be used. For example, it is quite satisfactory to mix the fiber-permeated liquid with plaster of Paris while the latter is being conveyed along on a belt, or a belt containing a layer of plaster of Paris may be passed through a bath of the liquid.

The fibers in the liquid above described have a tendency to hold the plaster of Paris in suspension as it were, thus insuring the production of a light product. This makes it possible to employ more water than can be used in the process of making the ordinary plaster board having a sawdust filler. It is, of course, desirable to use as much water as possible so that when the product is dried, the spaces occupied by the water will form a substantial portion of the mass.

After the plaster of Paris has been thoroughly mixed with the liquid containing the fibrous material, the mass is ready for delivery to the board machine to be rolled out into a thin sheet in conformity with standard practice. In the board machine, the plastic mass is rolled into intimate contact with the bottom liner and likewise with the top liner, if one is used. Some of the moisture from the gypsum soaks into the liners, facilitating the bonding of the paper to the gypsum core when the latter crystallizes or solidifies.

Following the usual practice, the gypsum layer can be formed in a continuous sheet which may be cut while still moist, to approximately finished dimensions. The moist sheets or panels so formed are then dried in a kiln as usual at 140 to 190° F. for about 24 hours.

As indicated above, the character of the product can be varied by altering the proportions of the fibrous material and the plaster of Paris. If it is so desired, a certain amount of accelerator such as raw gypsum may be employed with a view to accelerating the setting of the material. I have found it quite satisfactory to use an amount of raw gypsum which is in the neighborhood of from three to five percent by weight of the plaster of Paris employed. If there is not enough size in the waste paper which is reduced to pulp in the beater, I add additional sizing material such as resin and alum.

The gypsum board with the relatively small percentage of wood fibers added as above described, is much stronger than the ordinary plaster board containing sawdust, and stronger than the plaster board containing a starchy product as a means for rendering the product light and porous. The increased strength is probably due to the reinforcing action of the fibers distributed throughout the mass of gypsum. The fibers, being thoroughly saturated with water before the plaster of Paris comes in contact therewith, do not rob the plaster of Paris of any water and accordingly the material hardens properly at all points throughout the mass. The dimensions of the fibers are so small that any shrinking action which takes place when the product is dried is not sufficient to cause the fibers to pull away from the adjacent gypsum to any appreciable extent. The product does not chip easily and accordingly it is easier to saw and it can be easily nailed to the studding of a building without having the gypsum core break to pieces.

One of the principal advantages of my improved product is that it can be made at lower cost than the products which have heretofore been employed as a substitute for lath and plaster. The product is light, and the saving in gypsum alone is an important commercial consideration. A considerable saving in transportation costs is also effected by virtue of the lightness of the product. The cost of the raw materials is very low because of the cheapness of waste paper. My new product is therefore not only superior to the plaster wall board heretofore used so far as its physical properties are concerned, but it is cheaper to manufacture and ship.

It is to be understood that the proportions of the various ingredients and the steps of the improved process may be varied without departing from the spirit of my invention, which is not limited to the particular embodiments herein described but includes such modifications thereof as fall within the scope of the appended claims.

I claim:

1. In a method of making gypsum board, the steps which comprise subjecting a material consisting largely of wood fibers to the action of a beater until the fibers are separated in a pulpy mass, thinning the mass if necessary with water until the proportion of the fiber to the water of the resulting liquid is not more than 5% by weight, and forming a paste by mixing dry gypsum with the liquid until the gypsum and the liquid have the proportions of 100 pounds of gypsum to from 100 to 150 pounds of the liquid.

2. In a method of making gypsum board, the steps which comprise subjecting a material consisting largely of wood fibers to the action of a beater until the fibers are separated in a pulpy mass, thinning the mass if necessary with water until the proportion of the fiber to the water of the resulting liquid is not more than 5% by weight, and forming a paste by mixing dry gypsum with the liquid until the gypsum and the liquid have the proportions of 100 pounds of gypsum to approximately 120 pounds of the liquid.

3. In a method of making a gypsum board, the steps which comprise subjecting paper containing wood fibers to the action of a beater until the fibers are separated in a pulpy mass, thinning the mass with water until the proportion of the fibers to the water of the resulting liquid is not more than 5% by weight, and forming a paste by mixing dry gypsum with the liquid until the gypsum and the liquid have the proportions of 100 pounds of gypsum to from 100 to 150 pounds of the liquid.

4. The method of making a paper lined gypsum board, the steps which comprise reducing paper containing wood fibers to the form of a liquid containing not more than 5% by weight of the fibers, and forming a thick paste by intimately mixing dry gypsum with the liquid until the proportion of the fibers distributed throughout the gypsum is between 1½% and 5% by weight of the gypsum.

5. In a method of making a paper lined gypsum board, the steps which comprise reducing in a beater paper containing wood fibers to form a liquid containing approximately 2% by weight of the fibers, the fibers being in suspension throughout the liquid, and forming a thick paste by intimately mixing dry gypsum with the liquid until the proportion of the fibers to the gypsum is approximately 2% by weight.

6. A wall board consisting mainly of gypsum and wood fibers, the wood fibers having been thoroughly incorporated with the gypsum while in a water soaked condition, and the amount of fibers in the finished product not exceeding 5% by weight of the gypsum.

7. A wall board consisting mainly of gypsum and wood fibers, the wood fibers having been thoroughly incorporated with the gypsum while in a water soaked condition, and the amount of fibers in the finished product not exceeding 1½% to 5% by weight of the gypsum.

8. A wall board consisting mainly of gypsum and wood fibers, the wood fibers having been thoroughly incorporated with the gypsum while in a water soaked condition, and the amount of fibers in the finished product not exceeding 2% by weight of the gypsum.

9. In a method of making a gypsum board, the steps which comprise providing a liquid containing not more than 5 per cent by weight of pulped wood fibers thoroughly saturated with moisture, and forming a thick paste by intimately mixing said liquid with dry gypsum.

10. In a method of making a gypsum board, the steps which comprise providing a liquid containing from 1½ to 5 per cent by weight of wood fibers thoroughly beaten and saturated with moisture, and uniformly distributed throughout the liquid, and forming a thick paste by intimately mixing said liquid with dry gypsum.

11. In a method of making a gypsum board, the steps which comprise providing a liquid containing from 2 to 3 per cent by weight of pulped wood fibers thoroughly saturated with moisture, and forming a thick paste by intimately mixing said liquid with dry gypsum.

12. A wall board consisting mainly of gypsum and pulped wood fibers, the fibers having been thoroughly incorporated with the gypsum while in a water-soaked condition to insure proper hardening of the gypsum at all points and lightness of the product, the fibers being in direct contact with the gypsum, the relative amounts of fibers and gypsum being such that in the final product the gypsum comprises a rigid continuous structure reinforced by a fibrous material, the product being homogeneous throughout.

In testimony whereof I affix my signature.

JOSEPH F. HAGGERTY.

CERTIFICATE OF CORRECTION.

Patent No. 1,702,966.  Granted February 19, 1929, to

JOSEPH F. HAGGERTY.

It is hereby certified that error appears in the printed specification of the above numbered patent requiring correction as follows: Page 3, line 72, claim 4, for the article "The" read "In a"; and that the said Letters Patent should be read with this correction therein that the same may conform to the record of the case in the Patent Office.

Signed and sealed this 19th day of March, A. D. 1929.

(Seal)

M. J. Moore,
Acting Commissioner of Patents.

weight of pulped wood fibers thoroughly saturated with moisture, and forming a thick paste by intimately mixing said liquid with dry gypsum.

12. A wall board consisting mainly of gypsum and pulped wood fibers, the fibers having been thoroughly incorporated with the gypsum while in a water-soaked condition to insure proper hardening of the gypsum at all points and lightness of the product, the fibers being in direct contact with the gypsum, the relative amounts of fibers and gypsum being such that in the final product the gypsum comprises a rigid continuous structure reinforced by a fibrous material, the product being homogeneous throughout.

In testimony whereof I affix my signature.

JOSEPH F. HAGGERTY.

CERTIFICATE OF CORRECTION.

Patent No. 1,702,966.　　　　　　　　　　　　　Granted February 19, 1929, to

JOSEPH F. HAGGERTY.

It is hereby certified that error appears in the printed specification of the above numbered patent requiring correction as follows: Page 3, line 72, claim 4, for the article "The" read "In a"; and that the said Letters Patent should be read with this correction therein that the same may conform to the record of the case in the Patent Office.

Signed and sealed this 19th day of March, A. D. 1929.

(Seal)　　　　　　　　　　　　　　　　　　　　M. J. Moore,
　　　　　　　　　　　　　　　　　　　　Acting Commissioner of Patents.